United States Patent [19]

Abed et al.

[11] Patent Number: 4,627,038

[45] Date of Patent: Dec. 2, 1986

[54] OPTICAL DISK STORAGE UNIT HAVING A SERVO SYSTEM WITH DIFFERENT VELOCITY INPUTS

[75] Inventors: Majeed Abed, Lafayette; Robert P. McIntosh, Longmont, both of Colo.

[73] Assignee: Storage Technology Partners II, Louisville, Colo.

[21] Appl. No.: 627,774

[22] Filed: Jul. 5, 1984

[51] Int. Cl.$^4$ ............................................. G11B 7/085
[52] U.S. Cl. ........................................ 369/44; 369/30; 369/111
[58] Field of Search .................... 369/30, 32, 33, 44, 369/45, 46, 111, 50

[56] References Cited

U.S. PATENT DOCUMENTS 4,236,232 11/1980 Jansen et al. .......................... 369/33

*Primary Examiner*—Donald McElheny, Jr.
*Attorney, Agent, or Firm*—Woodcock Washburn Kurtz Mackiewicz & Norris

[57] ABSTRACT

An optical disk storage unit has an improved access and tracking system in which a low speed velocity signal is derived from a differentiated position error signal. The output of the differentiator is applied to a blanking circuit which disconnects the steep slope portion of the position error signal from a sample and hold circuit. A medium speed velocity signal is derived from the integral of motor current and a high speed velocity signal is derived by digitally counting the band crossings in the position error signal.

9 Claims, 15 Drawing Figures

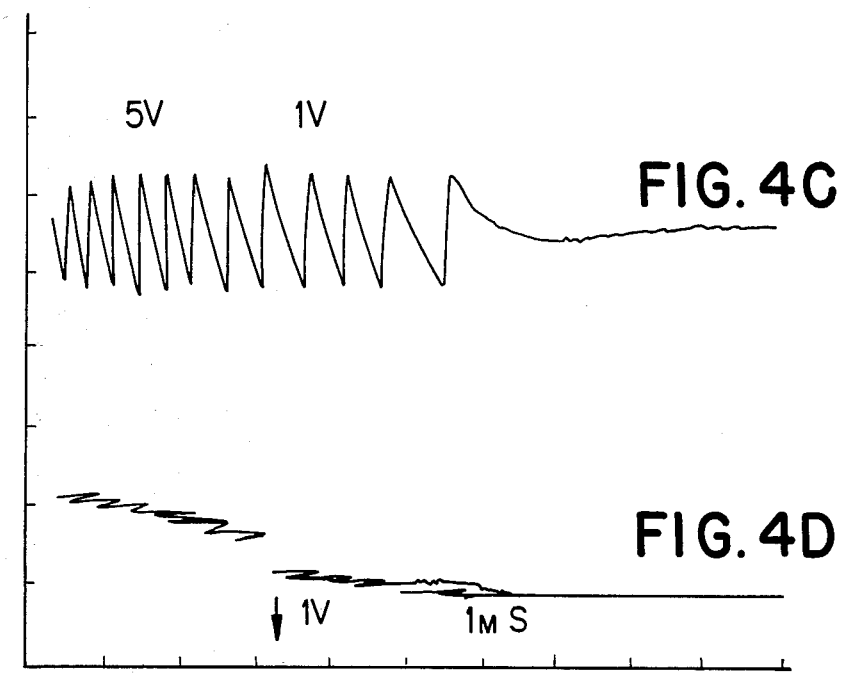
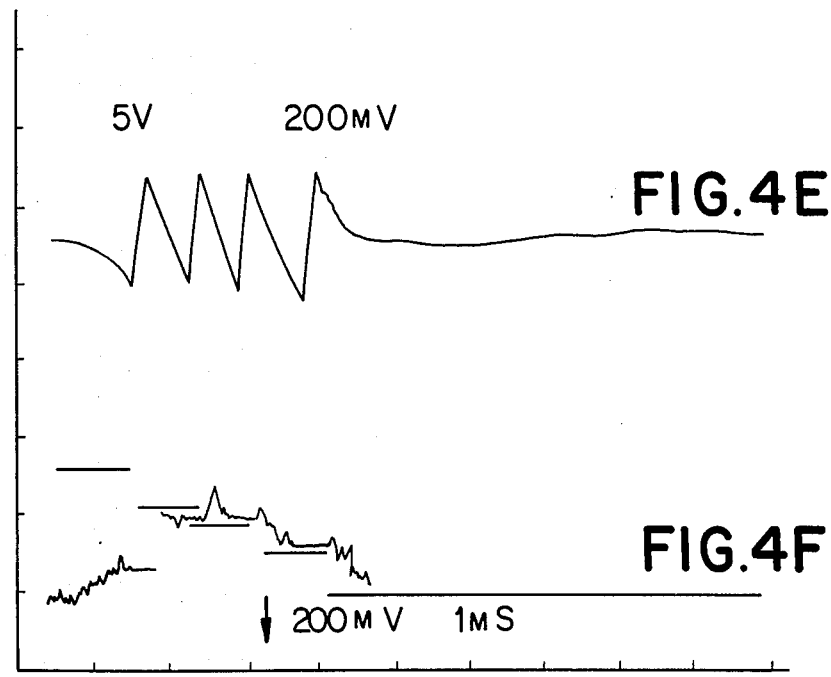

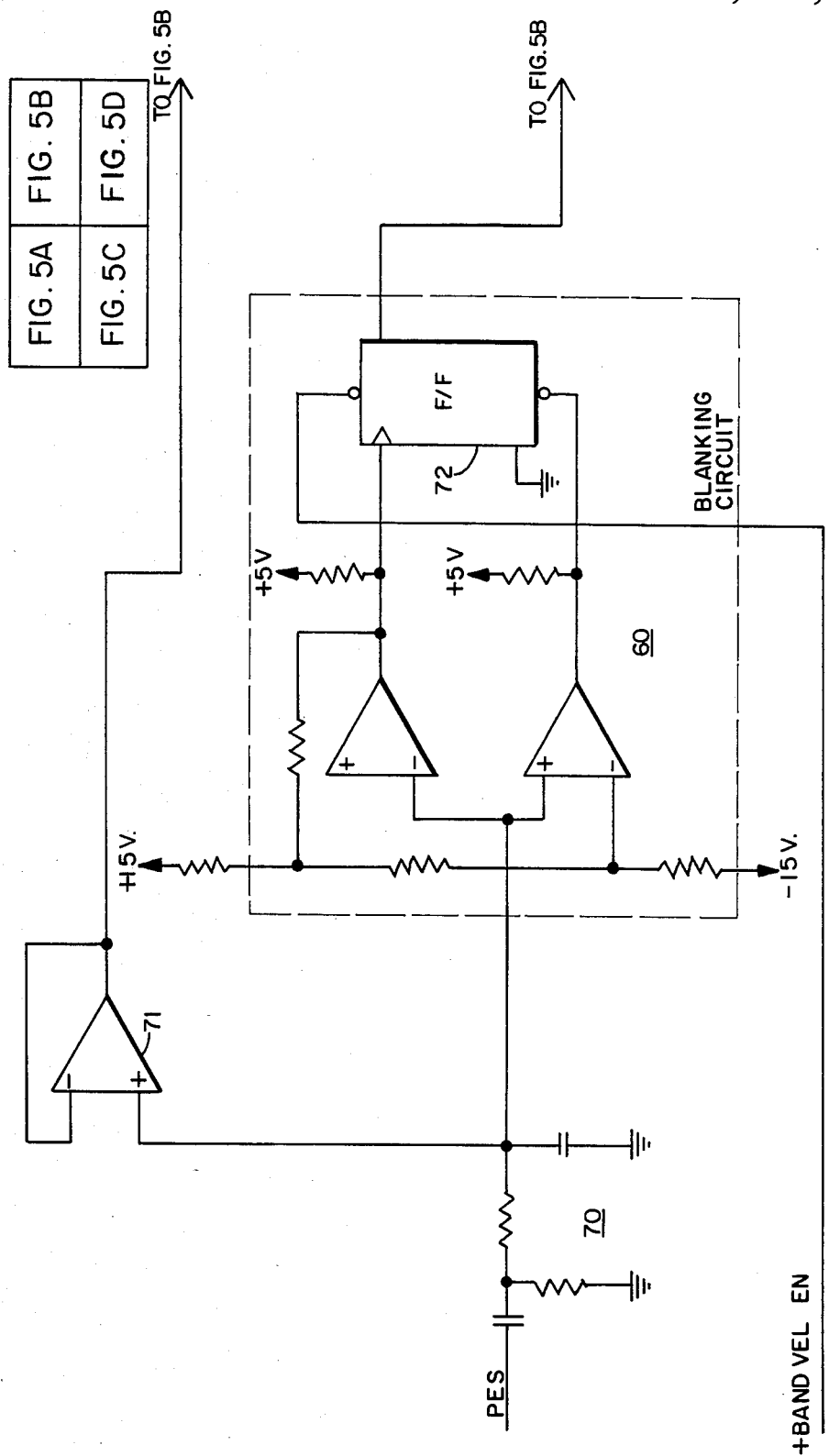

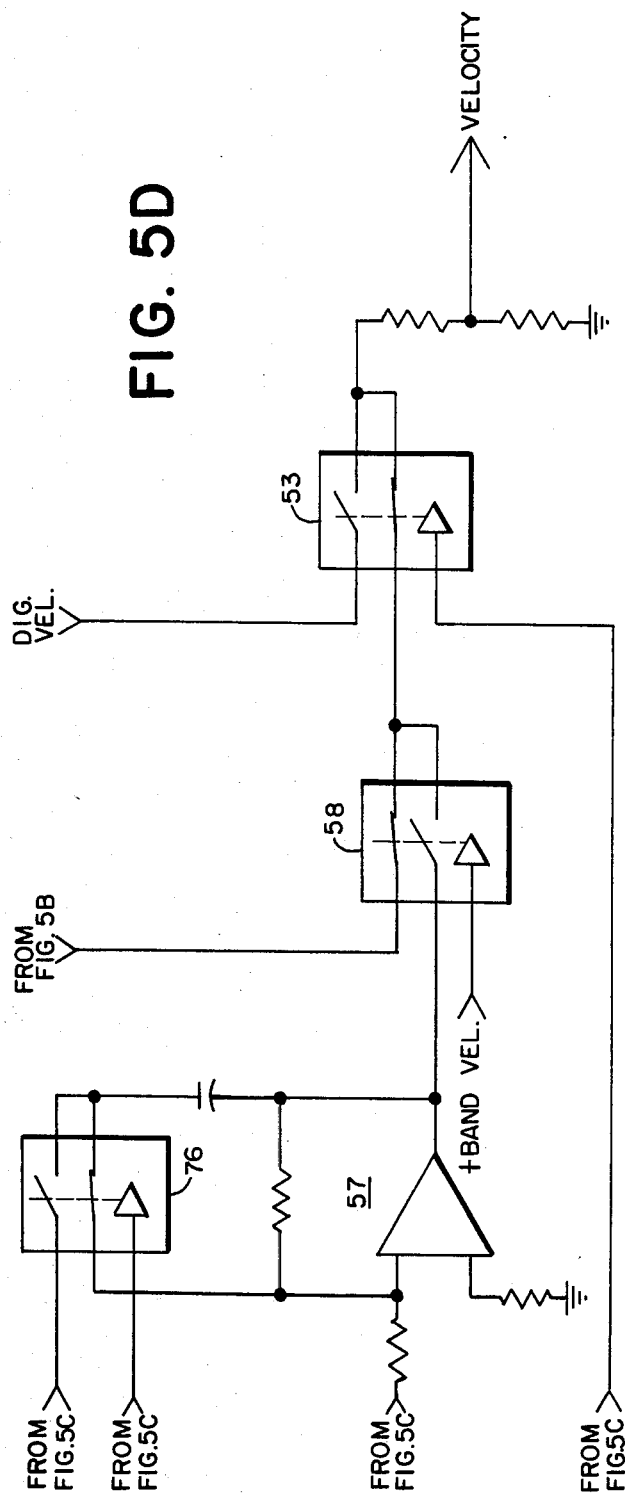

OPTICAL DISK STORAGE UNIT HAVING A SERVO SYSTEM WITH DIFFERENT VELOCITY INPUTS

BACKGROUND OF THE INVENTION

This invention relates to optical disk storage units, and more particularly, to an improved servo loop for the access and tracking system of such a unit. Optical data storage units which utilize a disk to optically store information have a servo system which controls the positioning of the read/write head to provide direct access to a given track of data. U.S. Application Ser. No. 438,133, filed Nov. 1, 1982, Stahl et al, now abandoned, and corresponding PCT application, International Publication No. W084/01849, published May 10, 1984, show a servo system for an optical disk storage unit.

Two tracking servo systems are employed to enable accurate reading and writing of data from or to data tracks. A coarse servo tracking system radially positions the optical head over a desired data band on the disk. A fine servo tracking system then optically (through the use of tracking mirrors attached to a galvonometer) positions the read/write beams on a desired track(s) within the data band.

Galvonometer controlled tracking mirrors have a limited radial range, hence the necessity for a coarse servo system that: (1) radially positions the optical head over a desired data band where the desired data track is located (coarse seeking), and (2) maintains the head in this desired position (coarse tracking). The coarse tracking servo accurately maintains the head with respect to a precision coarse servo track previously written on the disk, which coarse servo track is adjacent to the data band of concern.

The detection system employed in a drive of this type is a position detection system wherein a position error signal is generated indicating the position of the optical head with respect to a given data band. The position error signal has a sawtooth waveform including ramps as the head crosses each data band and a steep slope as the head crosses data bands.

For a number of reasons, a single velocity signal which represents true velocity over its entire range is not available in such a system. For this reason, it is necessary to derive a plurality of velocity signals, for low, medium and high head velocities.

It is an object of the present invention to generate a true velocity feedback signal from a detected position signal for use in a velocity servo system, which velocity servo system radially moves an optical head from over a source track to over a target track of an optical disk.

RELATED APPLICATION

Application Ser. No. 627,790, filed July 5, 1984, M. Abed, et al, "RUNOUT COMPENSATION FOR A COARSE TRACKING SERVO SYSTEM IN AN OPTICAL DISK STORAGE UNIT".

SUMMARY OF THE INVENTION

In accordance with the present invention, a low speed velocity signal is derived by differentiating the position error signal and applying it to a sample and hold circuit which produces a signal representing head velocity at radial head speeds which are less than, or equal to, the radial speed of the disk, caused by the eccentric rotation of the disk. A blanking circuit between the differentiator and the sample and hold circuit disconnects the output of the differentiator from the sample andnold circuit during the steep slope portions of the position error signal so that the output of the sample and hold circuit is a true velocity signal.

As the optical head moves radially from one data band (source) to another (target), it is desirous to move the head as quickly as possible. If the source data band and target data band are separated by a large radial distance, as is often the case, velocity feedback in the servo system is employed to quickly move the head along an optimum velocity profile. At high speeds, the velocity signal is derived from a digital detector which counts the "ramps" in the position error signal as a function of time. At medium speeds, the integral of the motor drive current signal is used to indicate velocity. At low speeds, when the radial velocity of the head is less than, or equal to the radial speed of the disk, the position error signal is differentiated in order to provide the desired velocity feedback.

As the head radially approaches the desired target band, the velocity of the head is being rapidly decreased because the head movement is being braked so the head can come to a stop precisely on the desired band. If the differentiation signal is derived and filtered with a large capacitor, the feedback signal is not a true velocity feedback signal as the head crosses over the last few bands. To avoid this, in accordance with the invention, the steep slope of the position error signal is blanked, thereby preventing a large spike from introducing error into the system.

The foregoing and other objects, features and advantages of the invention will be better understood from the following more detailed description and appended claims.

SHORT DESCRIPTION OF THE DRAWINGS

FIGS. 4A–4F are examples of position error, velocity, and trajectory signals during operation;

FIGS. 6A and 6B are waveforms of the velocity enable signals which select the proper velocity.

DESCRIPTION OF THE PREFERRED EMBODIMENT

Figure 1:
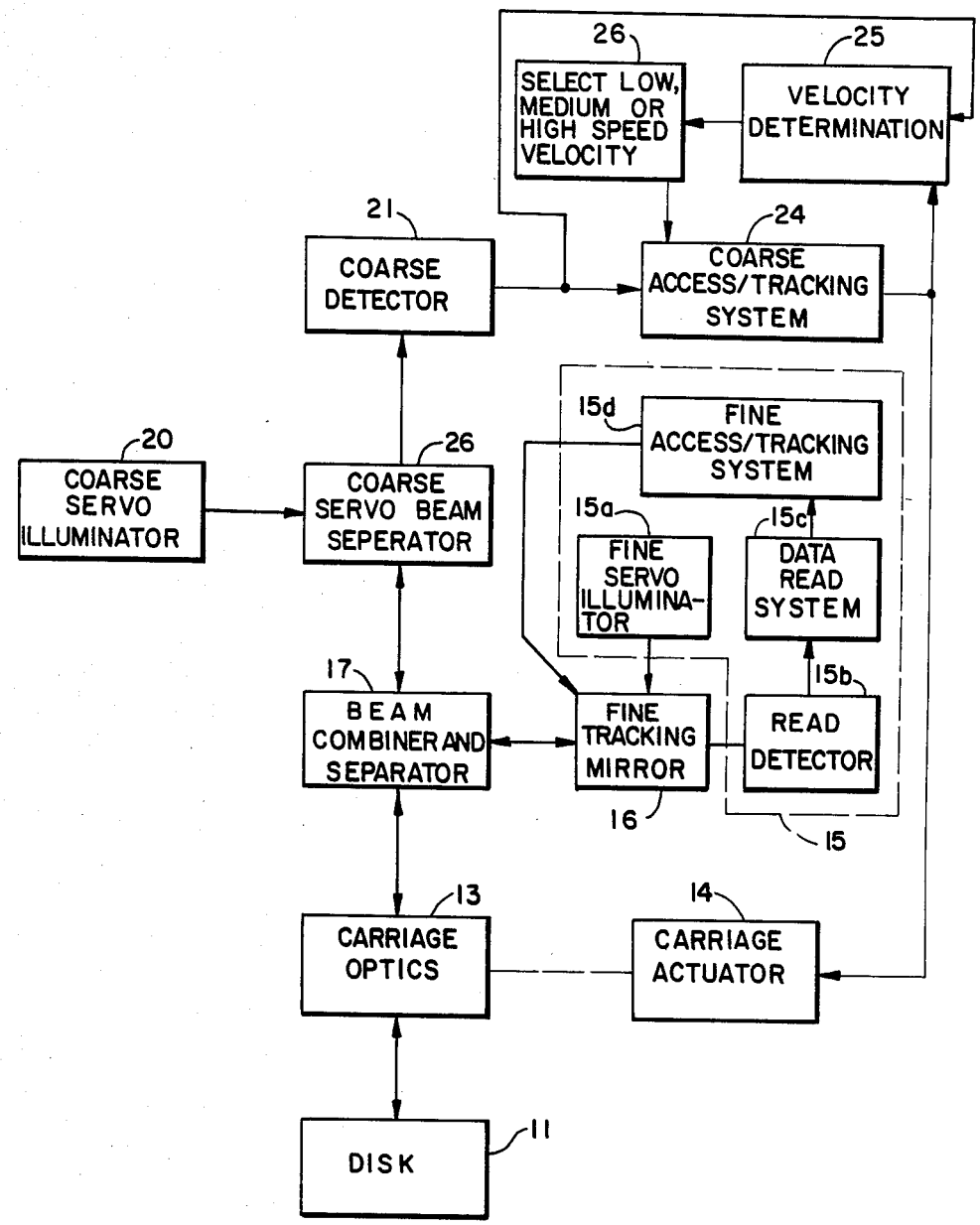
FIG. 1 depicts the optical storage unit upon the present invention is an improvement.

FIG. 1 shows a block diagram of the present invention in which the various optical paths associated with the system are shown as bold lines, electrical paths are indicated by fine lines, and mechanical coupling is indicated by dashed lines.

The system allows reading and writing from and to the surface of a disk 11 having a rotational axis and a plurality of concentric data bands. Each of the data bands includes a plurality of data tracks concentrically spaced about the rotational axis. The surface of the disk 11 has pre-recorded thereon, during manufacture, a plurality of optically readable servo tracks, concentrically and uniformly spaced about the rotational axis of the disk and positioned between the data bands An optical read/write head, depicted by the carriage optics 13, is positioned adjacent to the surface of the disk 11. Carriage actuator 14 selectively moves the read/write head along a radial axis, thereby moving the carriage optics 13 in a radial direction with respect to the disk 11 in order to access the data bands thereon.

A fine servo illuminator 15a projects a read or write light beam(s) onto the surface of the disk 11 so as to access data tracks thereon. In order to access the disk surface this beam is reflected by a fine tracking mirror 16, passes through a beam combiner and separator 17, as well as through the carriage optics 13. A read detector 15b reads light which has been reflected from the accessed recorded data track. This reflected light passes through the carriage optics 13 and beam combiner and separator 17 before reaching the read detector 15b. The read detector converts this light to an equivalent electrical signal(s). This read electrical signal is, in turn, supplied to a data read system 15c, and to a fine access/tracking servo system 15d.

The servo system for access to and tracking of the servo tracks also includes a coarse illuminator 20 which projects light through the coarse servo beam separator 26, the beam combiner and separator 17, and the carriage optics 13 onto a relatively broad portion of the disk surface. A coarse linear detector 21 detects reflected light from a portion of the disk surface. The illuminated portion of the disk surface spans at least the distance between two servo tracks, and thereby always illuminates at least one servo track. The detector 21 has a center null position. The output of linear detector 21 is applied to a coarse access/tracking servo system 24. This system is connected in a servo loop with actuator 14 which moves the read/write head (represented schematically by the carriage optics 13) into radial proximity of a selected servo track so that the fine access and tracking system 15d can accurately position read or write beams on a selected data track.

The above-identified Stahl et al application describes the access and tracking system in more detail and is incorporated herein by reference. In accordance with the present invention, a determination of velocity at low, medium and high speeds is made as indicated at 25, the velocity is selected as indicated at 26, and applied as feedback in the coarse access tracking servo system 24.

Figure 2:
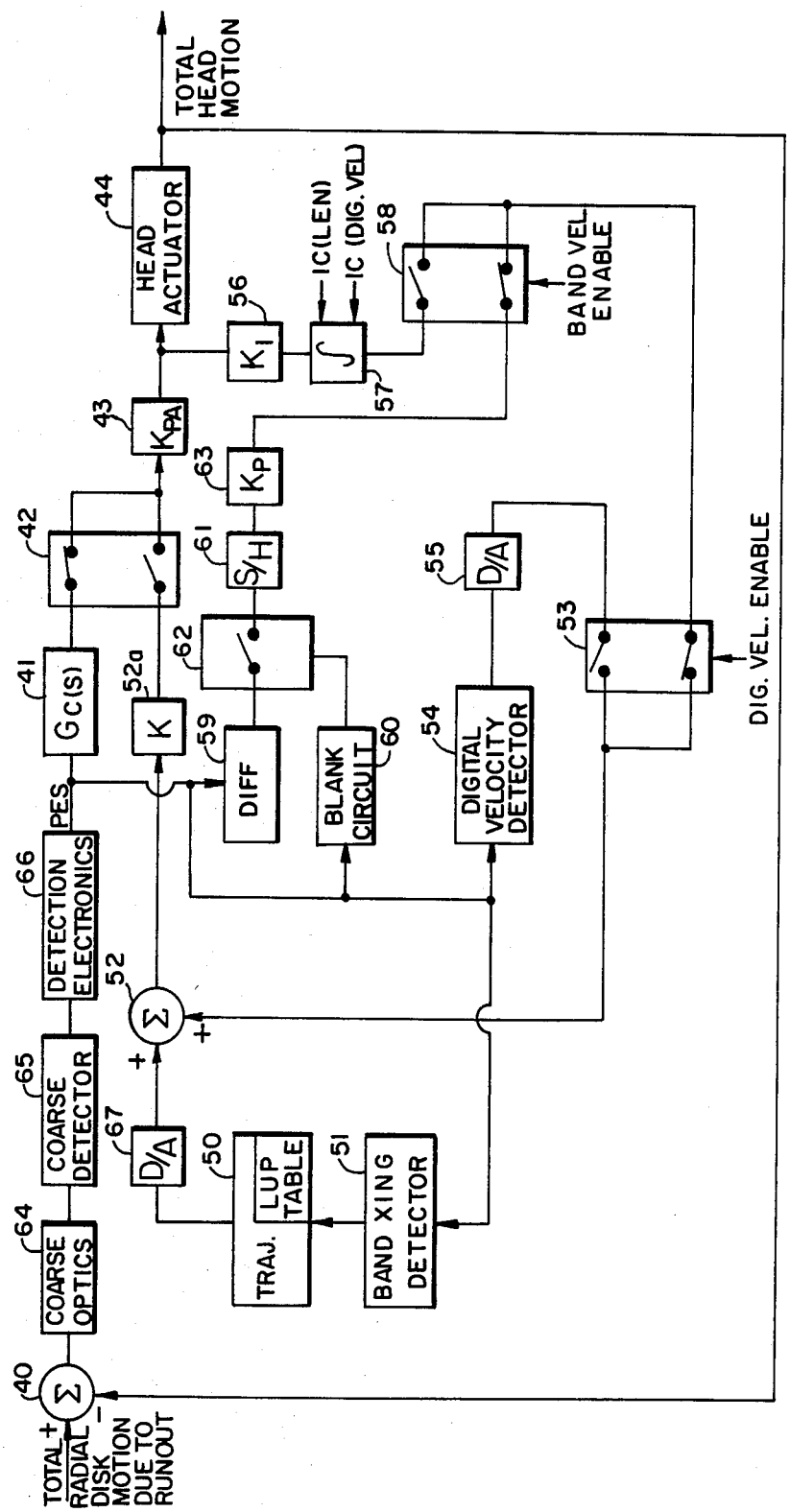
FIG. 2 is a block diagram depicting the invention.

The velocity derivation for the coarse access and tracking system of the present invention is shown in FIG. 2, which depicts a servo model for the coarse access and tracking system.

Referring to FIG. 2, the input to the coarse access and tracking system is the total radial disk motion due to runout. This input is compared, in summing junction 40, to the total head motion and processed by coarse optics 64 creating an optical image on coarse detector 65 representing the head to disk relative position. Coarse detector 65 generates an electrical signal(s) that is proportional to this optical image. Detection electronics 66 process the output of coarse detector 65 to generate an electrical signal that is proportional to the relative position between the head and the disk. This signal is called the position error signal (PES) as shown in FIG. 2. To help understand the present invention, it is important to note that any velocity signal derived from the PES is a measure of the relative velocity between the head and the disk. The servo loop is completed, as shown in FIG. 2 with amplifier 41 and a switch 42 which is in the position shown when the servo is tracking a particular data band and is in the other position (upper contacts open, lower contacts closed) when the servo is seeking a particular track. The servo loop further includes a power amplifier 43 which produces a drive signal that is applied to head actuator 44.

Figure 3:
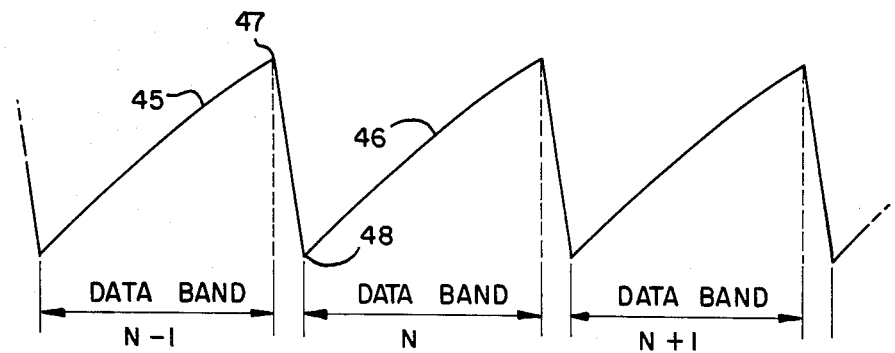
FIG. 3 is a waveform of the position error signal.

The position error signal is depicted in FIG. 3. It has a sawtooth waveform which includes ramps such as 45 and 46 produced as the head crosses each data band, and a steep slope such as that between the points 47 and 48 as the head crosses between data bands.

Referring again to FIG. 2, the tracking and access system includes a microprocessor 50 which contains a lookup table of the desired radial velocity of the head as it crosses each band and the optimum radial velocity as the head approaches the band which it is seeking. The data band crossings, as indicated by the ramps in the position error (PES) signal, are detected by band crossing detector 51. In response to the detected track crossings, microprocessor 50, through a digital-to-analog converter 67, produces a trajectory signal. The trajectory signal is compared to the measured relative head to disk velocity in the summing junction 52. The output of summing junction 52 is connected through amplifier 52a and switch 42 in the servo loop during a band seeking operation.

In accordance with the present invention, the velocity signal applied to the velocity input of summing junction 52 is developed in different ways depending upon whether the radial speed of the head is low, medium or high.

During a high speed head movement, a digital velocity signal is connected through the upper contacts of switch 53 to the velocity input of summing junction 52. The digital velocity signal is determined by digital velocity detector 54 which counts the band crossings of the PES signal as a function of time. For high velocities this is an excellent indication of velocity. It is converted to an analog signal in converter 55 and applied to the velocity input of summing junction 52.

During a medium speed movement, the integral of the motor current of the head actuator is a good indication of velocity. The drive signal at the output of power amplifier 43 is connected through an amplifier 56 to the integrator 57. When the radial velocity of the head is at a medium speed, the upper contact of switch 58 is closed and the lower contact is opened, thereby applying the medium speed velocity signal through the closed lower contacts of switch 53 to the velocity input of summing junction 52.

At radial speeds which are equal to or below the radial velocity of the disk, the integral of the motor current is not a true indication of velocity because it is a measure of head velocity alone, rather than of head to disk relative velocity. Therefore, an accurate method of measuring low head to disk relative velocity is required in order to complete the seek and accurately acquire the desired data band. At low velocities the upper contact of switch 58 is opened and the lower contact is closed, thereby applying a low velocity signal to the velocity input of the summing junction 52. This low velocity signal is generated by differentiator 59, which differentiates the ramp of the position error signal.

In order to generate an accurate representation of velocity in this manner, the use of filters, which include a large capacitor which will distort or suppress the velocity indication, must be avoided. Instead, in accordance with the present invention, a blanking circuit 60 and a sample and hold circuit 61 are used. The blanking circuit 60 opens switch 62 to disconnect the output of differentiator 59 from sample and hold circuit 61 during the steep slope of the position error signal so that the output of the sample and hold circuit 61 is a good indication of velocity at low speeds. The signal is connected through amplifier 63 to the velocity input of the servo loop summing junction 52.

Figure 4A:
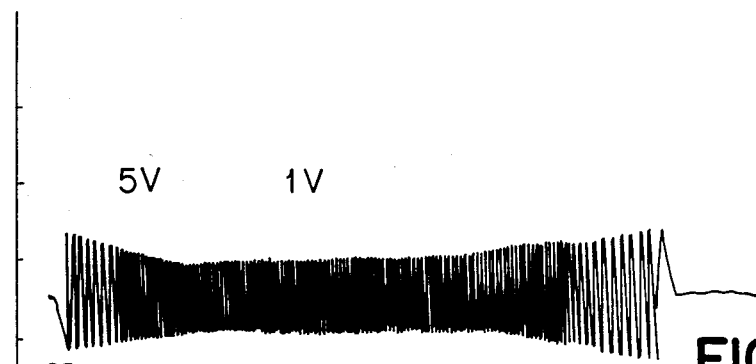
Figure 4B:
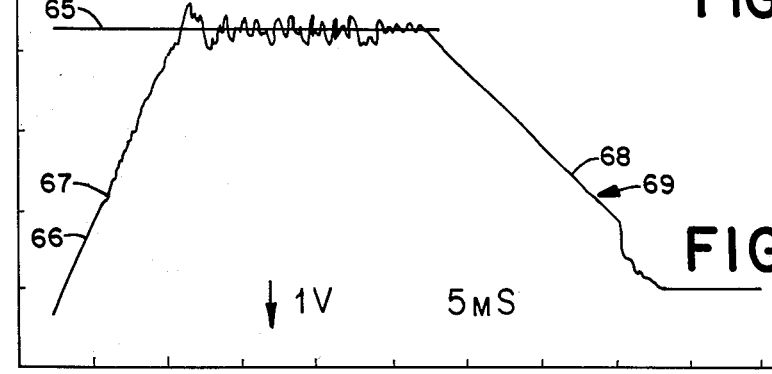

The operation of the system can be better understood by referring to the waveforms of FIGS. 4A-4F. In these waveforms the ordinate is 1 volt per division, and the abscissa is 5 milliseconds per division. FIG. 4A shows the position error signal which has a vertical scale of 5 volts/division and FIG. 4B shows the trajectory and velocity signals for a 256 data band seek in an outward direction. In FIG. 4B, the trajectory signal is indicated at 65 with the velocity signal 66 being superimposed upon it during most of the seek. Starting at the left, the velocity signal is represented by the integral of motor current until the time indicated at 67. Then, the digital velocity signal is used to represent velocity. The velocity signal rises and tracks the trajectory signal 65. Well before the sought-for band is reached, the trajectory signal starts down, and the velocity signal tracks it. At the time 68 the number of band crossings per increment of time is no longer sufficiently high to provide a true indication of velocity. At the time 68 the integral velocity is used until the time 69. At this point, the differentiated position error signal is used as an indication of velocity until the servo system homes on the sought-for data band. In the exemplary embodiment, this low speed velocity signal is used for the last four band crossings.

FIGS. 4C and 4D are enlargements of the velocity signal, particularly showing the last four data bands crossed. The velocity signal appearing at the output of the sample and hold circuit can be seen in four segments during the last four data band crossings.

The operation of the sample and hold circuit is even more vividly depicted in FIGS. 4E and 4F, which show the PES signal and the velocity and trajectory signals during a four track seek. The segments of the velocity signal produced by the sample and hold circuit as it closely tracks the trajectory signal are shown in 4F.

An exemplary circuit for implementing the invention is depicted in FIGS. 5A-5D wherein like reference numerals are used to denote the same components shown in block form in FIG. 2.

Figure 5B:
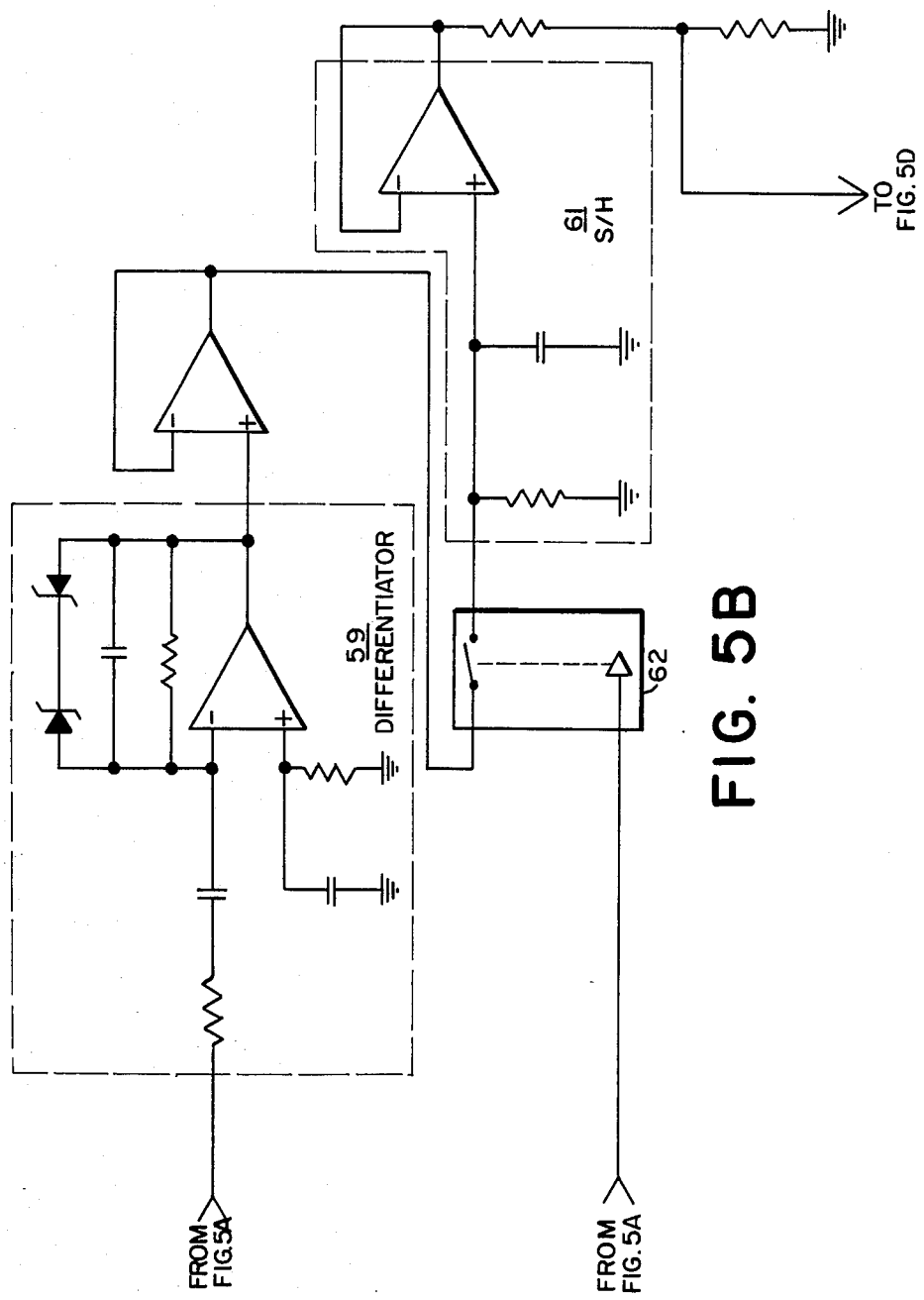
FIG. 5 shows the manner in which FIGS. 5A–5D fit together to form a circuit diagram of the invention.

Referring to FIG. 5A, the PES signal is applied through filter 70 and buffer 71 to the differentiator 59. (FIG. 5B). Blanking circuit 60 (FIG. 5A) has a flip flop 72 which is set during the steep slope portion of the PES signal. During this portion of the signal, the switch 62 disconnects the output of differentiator of 59 from the input to sample and hold circuit 61. The output of sample and hold circuit 61 is the low speed velocity signal.

Figure 5C:
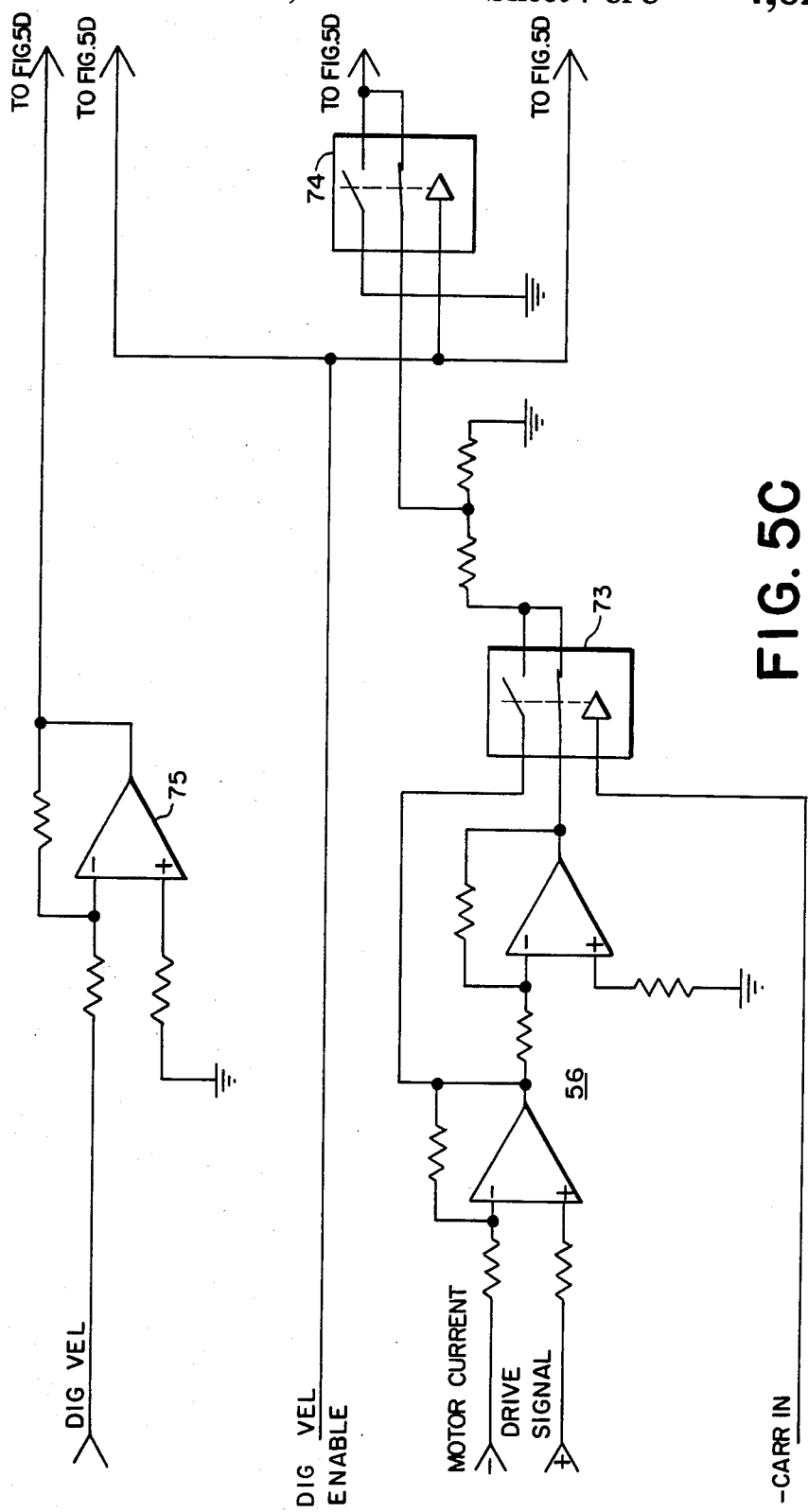

Referring to FIG. 5C, a measure of motor current drive signal is applied to the buffers 56. Both phases of this drive signal are applied to the buffers 56. One is selected for processing in accordance with whether the head is moving in or out. In this manner, the integrated drive signal will always have the same phase.

Provision is made to set the input condition on the integrator at the time of a switch from the use of digital velocity to analog velocity. Referring to FIG. 5C, the signal DIG VEL, from velocity detector 54 (FIG. 2), is used to set the initial condition for the integrator. It is coupled through buffer 75 and switch 76 (FIG. 5D) to the integrator. FET switch 74 is used to ground the input to the integrator while the initial condition is being set up on the integrator. With switch 74 in the position shown, the motor current signal is connected to the integrator 57. (FIG. 5D).

The FET switch 58 (FIG. 5D) selects either of the two analog velocities. The FET switch 53 selects either the digital velocity signal DIG VEL, from digital velocity detector 54 in FIG. 2, or it selects an analog velocity.

Switches 53, 58, 74 and 76 are set by the signals DIG VEL EN and BAND VEL EN which are shown in FIGS. 6A and 6B. The speeds at which the different velocity signals are switched in and out will vary In an exemplary embodiment, the low speed velocity was used in the first four data bands, up to a radial velocity of about 4 in/sec; the medium speed velocity signal was used for radial velocities in a range of 4 in/sec to 10 in/sec; and the high speed velocity signal was used above 10 in/sec.

While a particular embodiment of the invention has been shown and described, various modifications are within the true spirit and scope of the invention. The appended claims are, therefore, intended to cover all such modifications.

What is claimed is:

1. In an optical disk storage unit for reading data from or writing data to a disk surface having a rotational axis and a plurality of data bands having data tracks concentrically spaced about said rotational axis comprising;

means for rotating said disk surface about said rotational axis;

an optical head positioned adjacent to the disk surface for reading or writing;

means for positioning said head with respect to said disk surface in a radial direction;

means for projecting read/write light beams through said head onto said disk surface relative to one of said tracks;

a plurality of optically readable servo tracks concentrically spaced about the rotational axis of said disk between said data bands;

an improved access and tracking system including a light source for continuously illuminating a portion of said disk surface that spans the width of at least one data band, including at least one servo track, and a detector for detecitng light returned from said portion including light returned from said illuminated servo track, the output of said system being a position error signal having a sawtooth waveform including ramps as said head crosses each data band a steep slope as said head crosses between data bands;

a differentiator, said position error signal being applied to said differentiator;

a sample and hold circuit, the output of said differentiator being applied to said sample and hold circuit, a blanking circuit having a switch connected between said differentiator and said sample and hold circuit to disconnect the output of said differentiator during said steep slope of said position error signal so that the output of said sample and hold circuit is a velocity signal; and a servo loop responsive to said velocity signal and to said position error signal to produce a drive signal for said means for positioning said head.

2. The system recited in claim 1 wherein the output of said sample and hold circuit is a low speed velocity signal further comprising:

an integrator, said drive signal being applied to said integrator to produce a medium speed velocity signal; and a switch connecting said low speed velocity signal to said servo loop when the radial speed of said head is below the radial velocity of said disk and connecting said medium speed velocity signal to said velocity input at greater head velocity speeds.

3. The system recited in claim 2 further comprising:

a digital velocity detector responsive to said position error signal for producing a digital velocity signal and a second switch for connecting said digital velocity detector to said velocity input at high radial head speeds.

4. The system recited in claims 1 or 3 further comprising:

means for generating a trajectory signal representing the desired position of said head as it approaches a desired data band; and a summing circuit, said velocity signal being one input to said summing circuit and said trajectory signal being the other input.

5. The system recited in claim 3 wherein said integrator includes a capacitor.

6. The system recited in claim 5 further comprising:

means for presetting the voltage on said capacitor to the value of said digital velocity signal at the time of switching between said medium and low speed velocity signals.

7. In an optical disk storage unit for reading data from or writing data to a disk surface having a rotational axis and a plurality of data bands having data tracks concentrically spaced about said rotational axis comprising:

means for rotating said disk surface about said rotational axis;

an optical head positioned adjacent to the disk surface for reading or writing;

means responsive to a drive signal for positioning said head with respect to said disk surface in a radial direction;

means for projecting read/write light beams through said head onto said disk surface relative to one of said tracks;

a plurality of optically readable servo tracks concentrically spaced about the rotational axis of said disk between said data bands;

an improved access and tracking system including a light source for continuously illuminating a portion of said disk surface that spans the width of at least one data band, including at least one servo track, and a detector for detecting light returned from said portion including light retured from said illuminated servo track, the output of said system being a position error signal having a sawtooth waveform including ramps as said head crosses each data band and a steep slope as said head crosses between data bands;

a differentiator, said position error signal being applied to said differentiator to produce a low speed velocity signal;

means responsive to said drive signal for producing a medium speed velocity signal;

a digital velocity detector responsive to said position error signal for producing a high speed velocity signal;

a servo loop responsive to one of said velocity signals and to said position error signal to produce said drive signal; and switch means for connecting one of said low, medium, or high speed vlelocity signals to said servo loop.

8. The system recited in claim 7 further comprising:

an integrator, said drive signal being applied to said integrator to produce said medium speed velocity signal.

9. The system recited in claim 7, wherein said switch means comprises:

a switch connecting said low speed velocity signal to said servo loop when the radial speed of said head is below the radial velocity of said disk and connecting said medium speed velocity signal to said servo loop at greater velocity speeds; and a second switch for connecting said digital velocity detector to said servo loop at high radial head speeds.

* * * * *